July 28, 1942.  R. L. STARK ET AL  2,291,115
WIRED MUSIC DISTRIBUTION SYSTEM
Filed Aug. 3, 1940  10 Sheets-Sheet 1
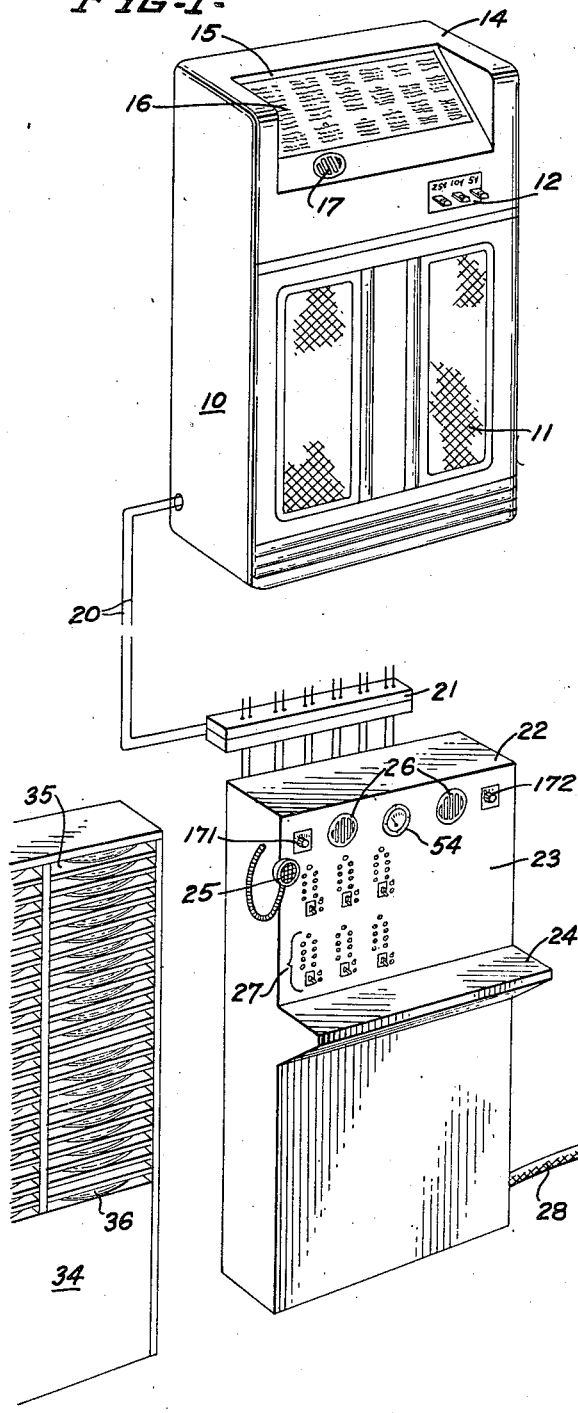
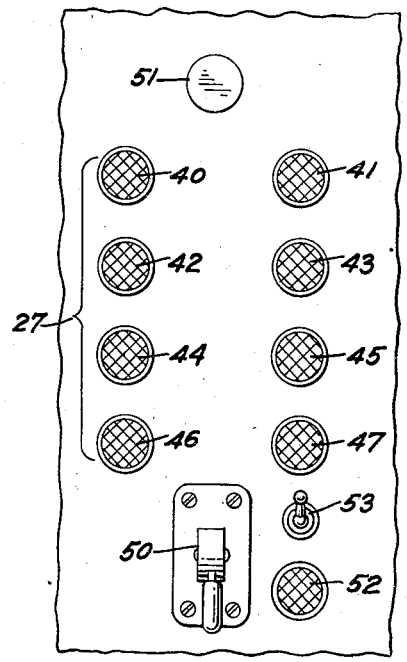
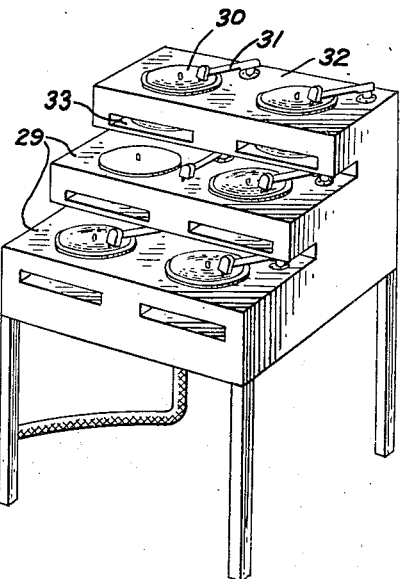
INVENTORS
ROBERT L. STARK
LEONARD L. LEYRER
BY
Lippincott & Metcalf
ATTORNEYS

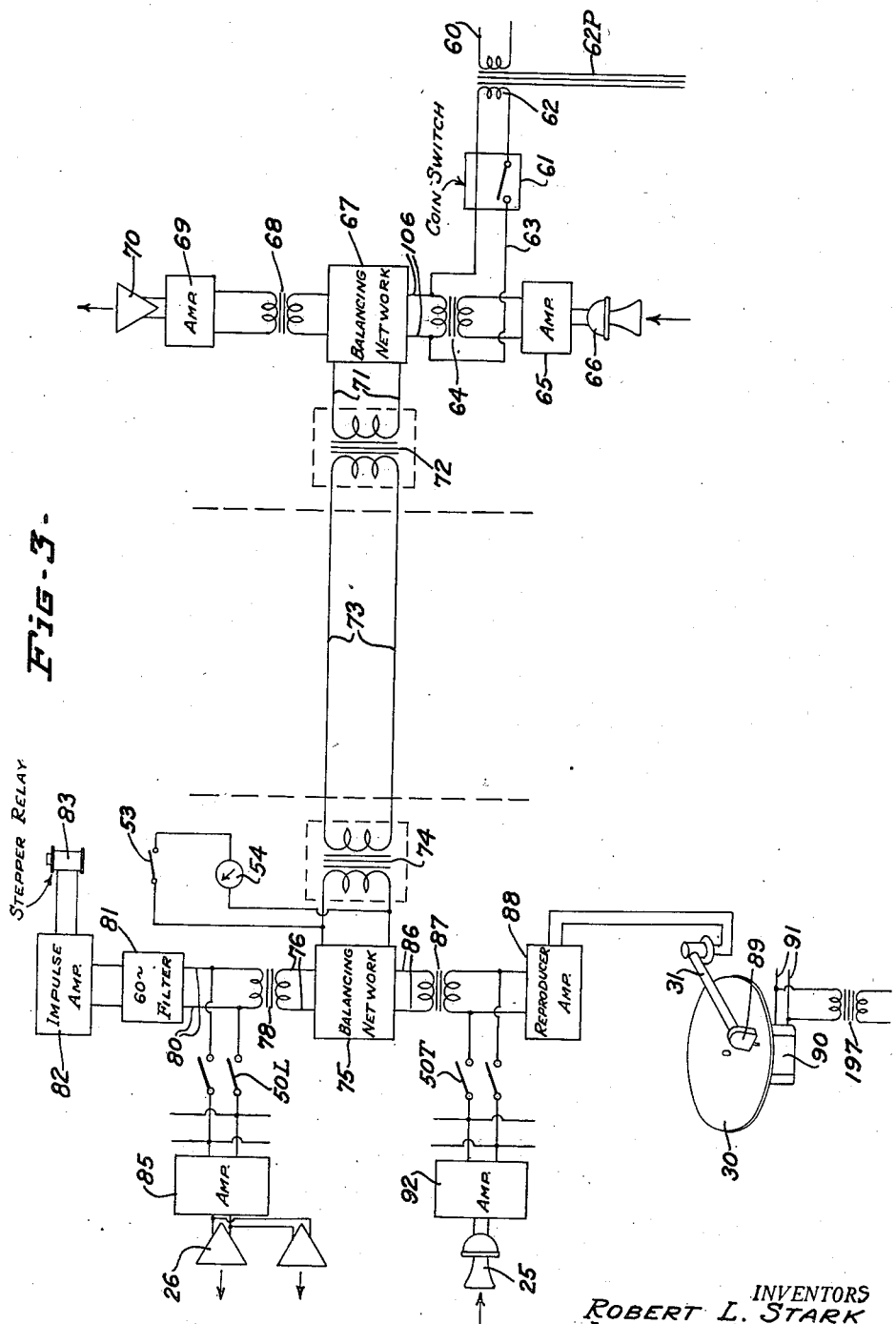

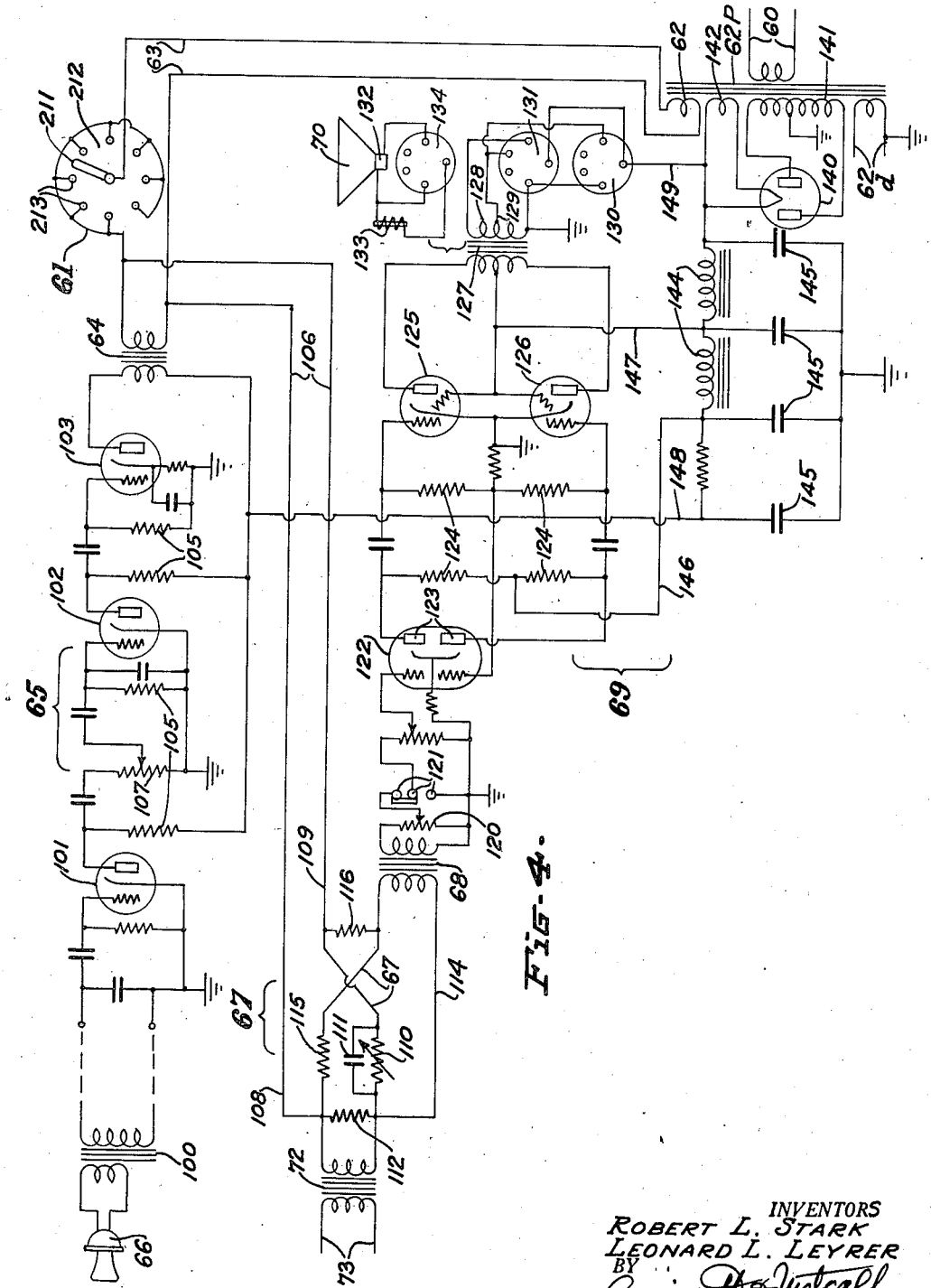

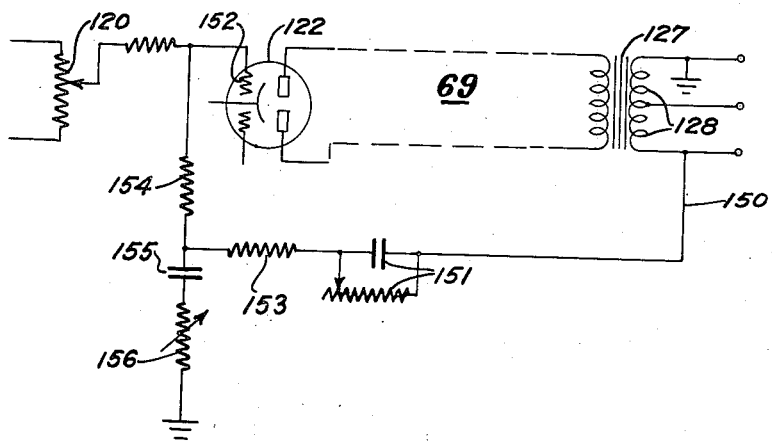
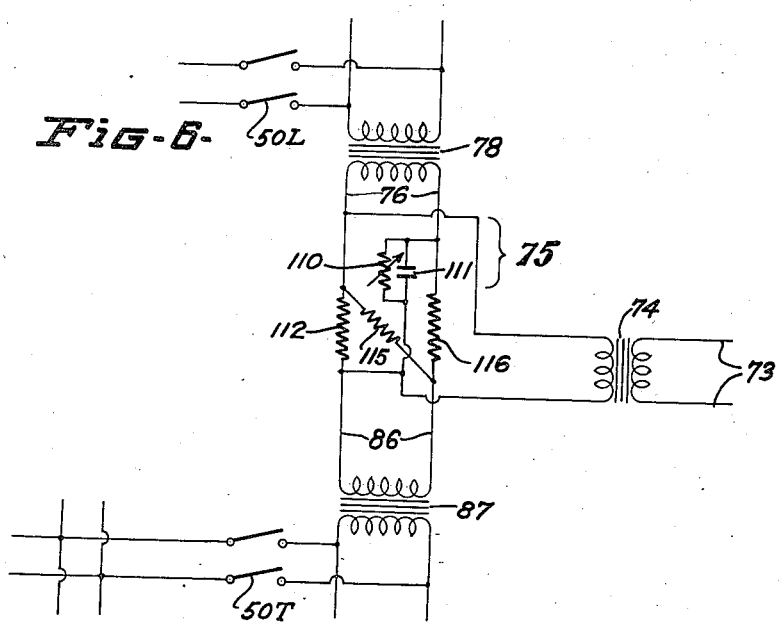

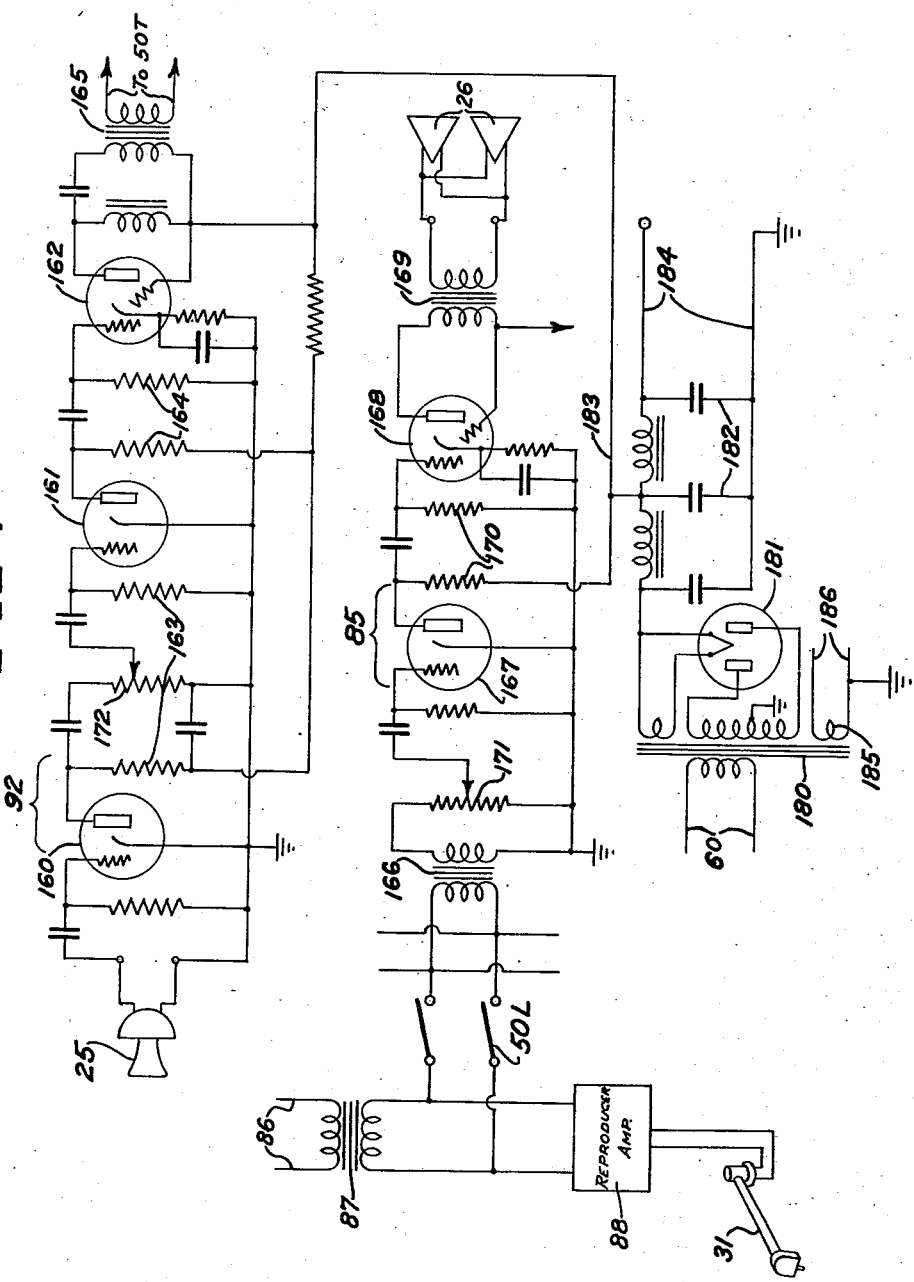

Fig-8-
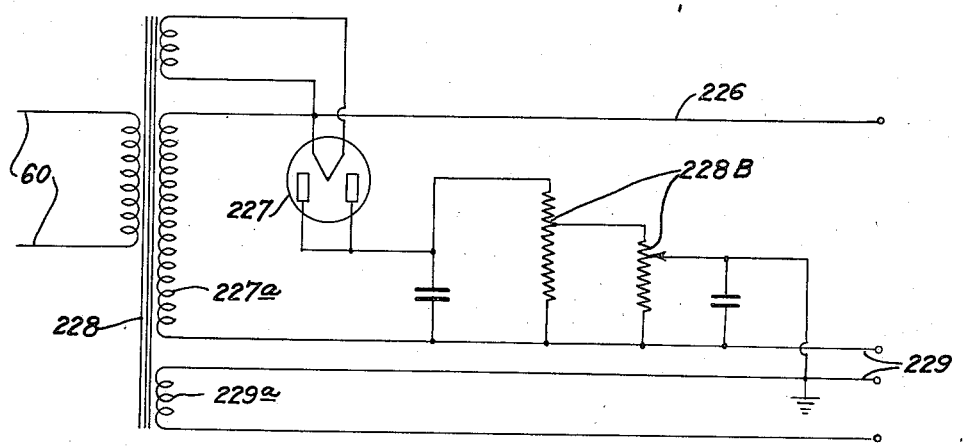
Fig-9-
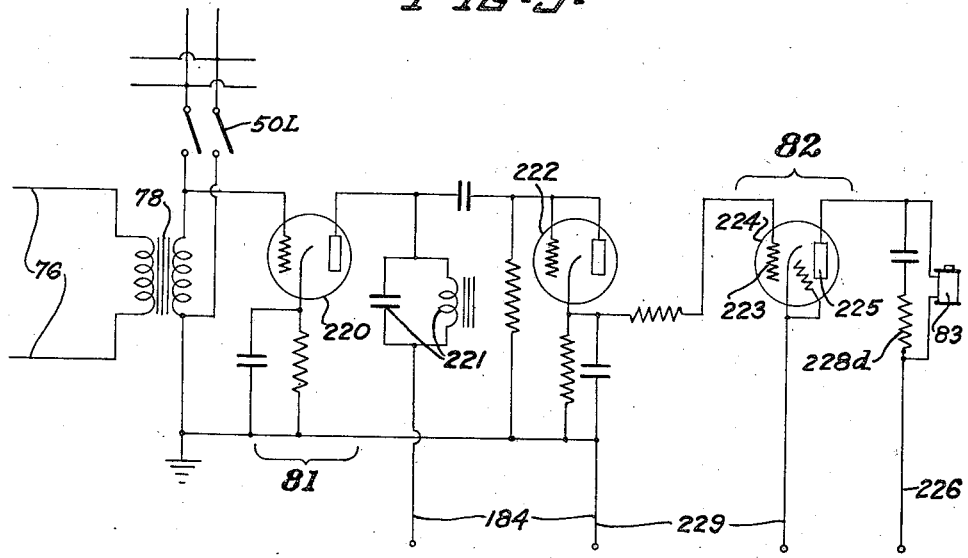
INVENTORS
ROBERT L. STARK
LEONARD L. LEYRER
BY
Lippincott & Metcalf
ATTORNEYS July 28, 1942.   R. L. STARK ET AL   2,291,115
WIRED MUSIC DISTRIBUTION SYSTEM
Filed Aug. 3, 1940   10 Sheets-Sheet 7
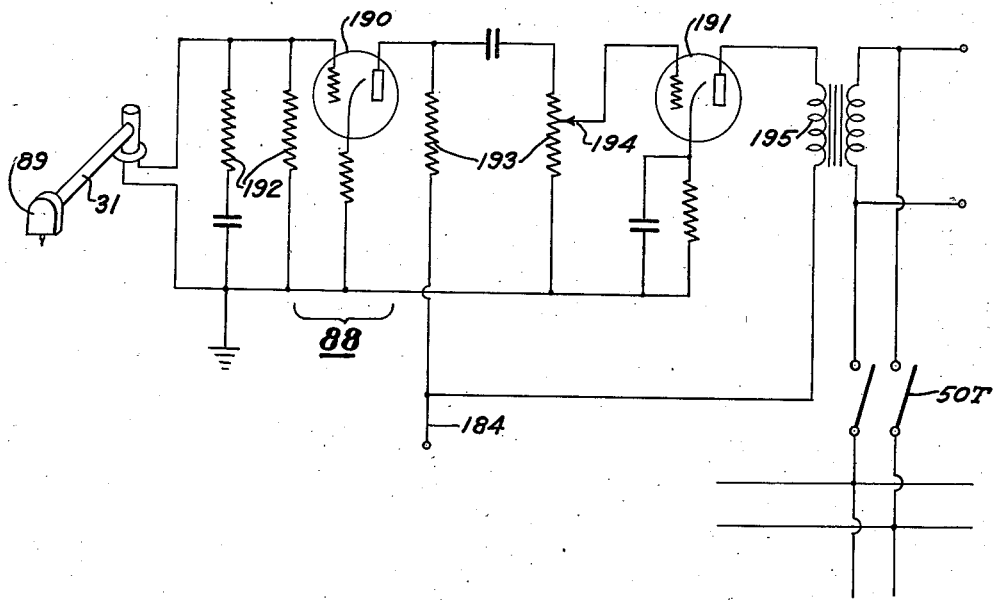
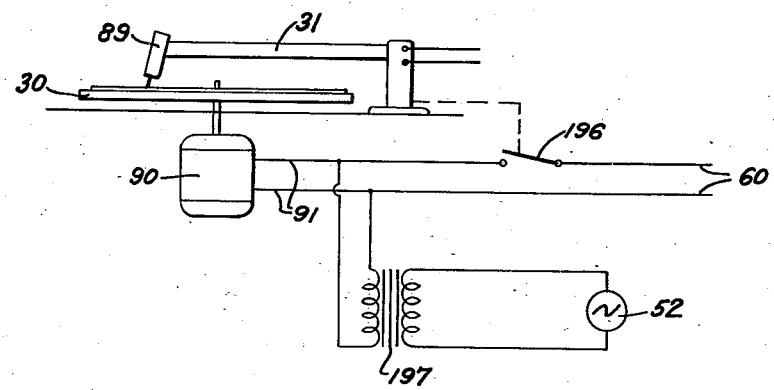
INVENTORS
ROBERT L. STARK
LEONARD L. LEYRER
BY
ATTORNEYS.

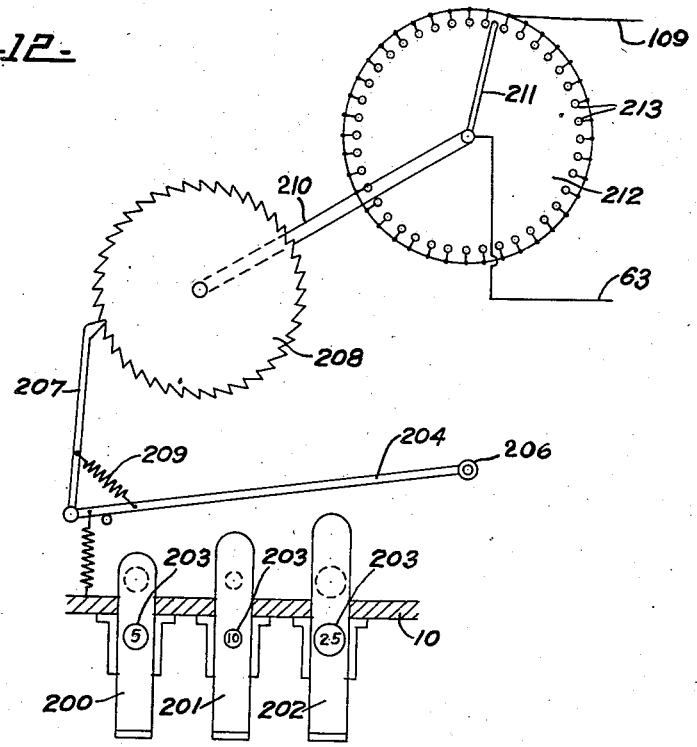
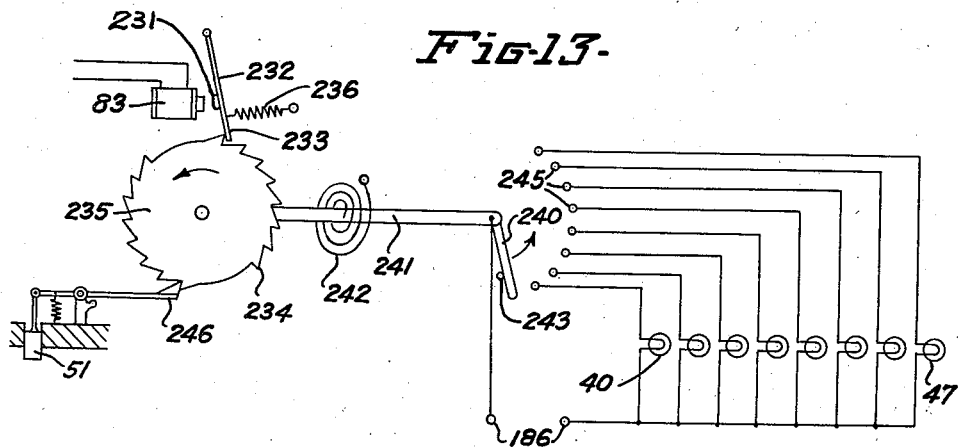

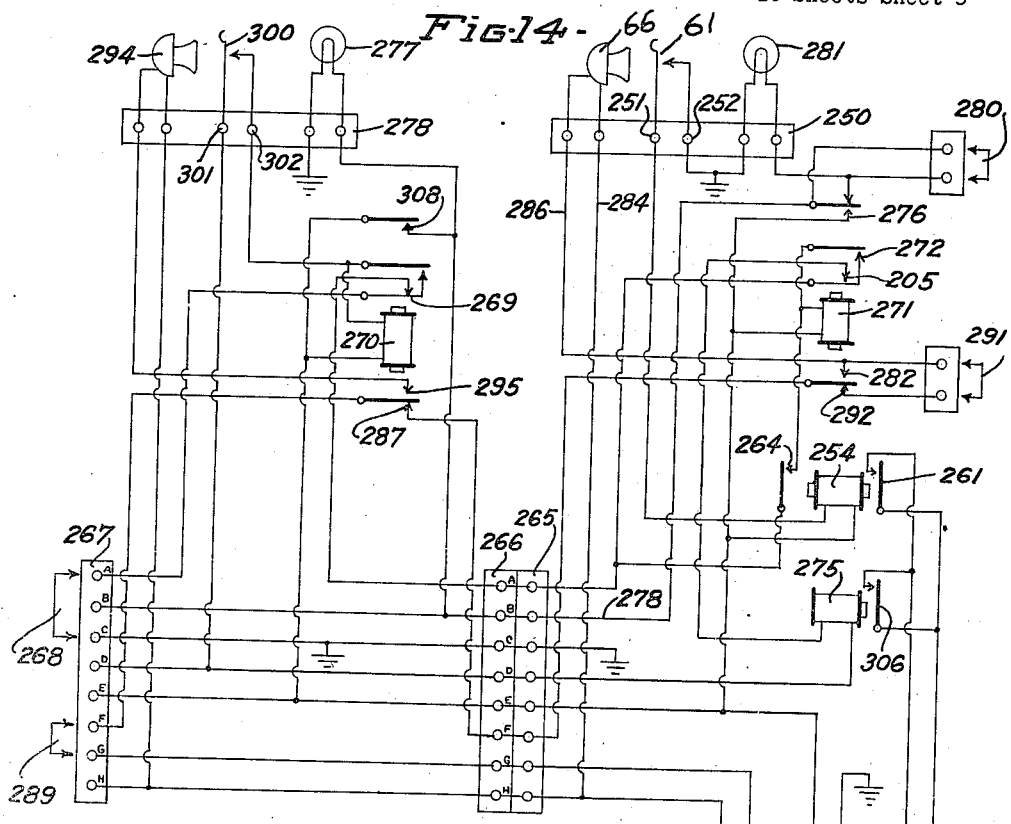
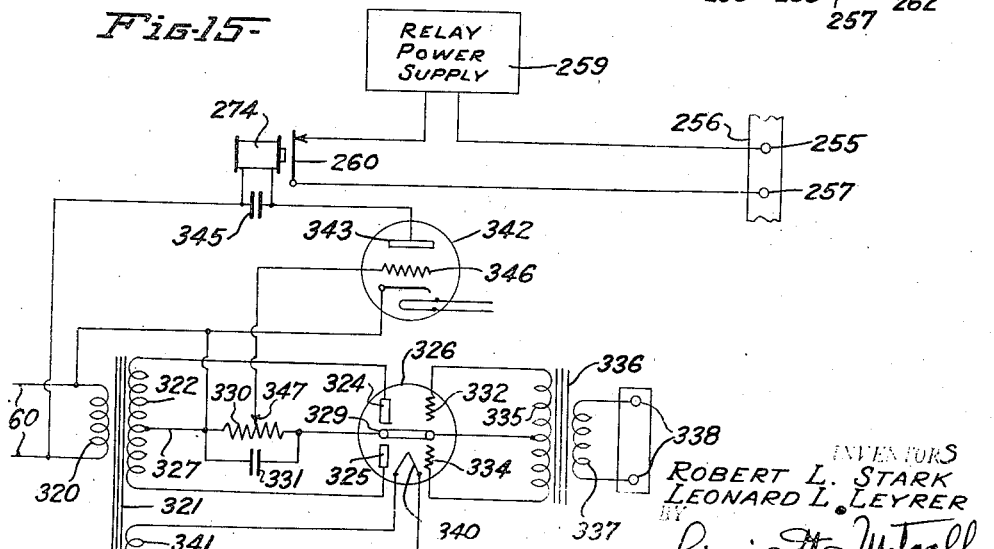

Patented July 28, 1942

2,291,115

UNITED STATES PATENT OFFICE 2,291;115

WIRED MUSIC DISTRIBUTION SYSTEM

Robert L. Stark, Los Angeles, and Leonard L. Leyrer, San Francisco, Calif.

Application August 3, 1940, Serial No. 350,934

17 Claims. (Cl. 179—6)

Our invention relates to wired music distribution systems and more particularly to a system for distributing music to outlying stations from a central location. Our system is ideally adapted for coin control for the playing of phonograph records.

Among the objects of our invention are: To provide musical entertainment in a plurality of outlying stations transmitted from a single centralized location; to provide such a system operating over a single wire pair between the central location and each outlying station; to provide a remote controlled phonograph music distributing system having a practically unlimited source of available selections; to provide a music distribution system incorporating a personal element; to provide a coin controlled phonograph record reproducer operated from a central station with two-way communication therewith; to provide such a system operating over a single pair of wires; to provide a coin controlled phonograph reproducing system remotely operated from a central location; to provide interconnected phonograph reproducers in a plurality of locations; to provide a high fidelity remote control sound distribution system operating over commercial telephone lines; to provide a musical entertainment system that is simple and under the control of a single centralized operator; to provide a coin operated sound distribution system giving an accumulative record of coin values; to provide a two-way sound distribution system operating from a central location; to provide a high fidelity coin controlled music distribution system.

Our invention possesses numerous other objects and features of advantage, some of which, together with the foregoing, will be set forth in the following description of specific apparatus embodying and utilizing our novel method. It is therefore to be understood that our method is applicable to other apparatus, and that we do not limit ourselves, in any way, to the apparatus of the present application, as we may adopt various other apparatus embodiments, utilizing the method, within the scope of the appended claims.

Due to the desirability of providing music in public places such as cocktail parlors, hotel lobbies, railroad, ferry and bus stations, or in other places where the public congregates, coin operated automatic phonographs have been developed wherein a limited number of phonograph records may be stacked and selectively played upon the insertion of the proper coin in the apparatus. The music provided by such a system is generally satisfactory, with the exception that the selections available are always limited by the ability of the machine to handle only a certain limited number of records, and by the fact that such machines are expensive, intricate, and therefore subject to relatively high service charges. They are also completely impersonal, and it is one of the main objects of the present invention to provide a coin operated music reproducer which can be installed in such public places as outlined above, operated from a central location to which a plurality of other similar reproducing stations are connected, under the control of a human operator. Under such conditions the equipment which is utilized in the reproducing unit need only be a small fraction of that ordinarily used in an automatic phonograph and therefore is much less subject to trouble and requires far less service. Furthermore, a central operator may have at her disposal, for women are customarily used for this type of work, a practically unlimited selection of records, so that the person who wishes music reproduced is able to select practically any record he or she so desires.

The assembly of the major portion of the equipment at a central station which may, for example, have as many as twenty outlying stations, makes for ease of service and for a great reduction in cost, both of initial installation and of operation. With personal attention, a human operator greatly increases the income of the coin operated system and sustains the interest of customers far beyond that of the automatic phonograph. We have found that a system comprising twenty outlying stations operated from one single, preferably, central location, over wire pairs leased or otherwise obtained from the local telephone company, forms a simple and efficient system for distributing music for entertainment purposes, and one preferred form of such a system will be described herein.

In the drawings:

Fig. 1 is a diagrammatic perspective view of the physical units comprised in the system of our invention, only one outlying station being illustrated.

Fig. 2 is a face view of a single coin recording and switch and pilot assembly, used by the central station operator.

Fig. 3 is a block diagram of the central station connected through a single pair of wires to a single reproducing station.

Fig. 4 is a preferred wiring diagram for an outlying reproducing station.

Fig. 5 is a partial diagram of a tone control connection which may be utilized in conjunction with the reproducing circuit shown in Fig. 4.

Fig. 6 is a wiring diagram of a preferred balancing network used at the central station, and at the reproducing station.

Fig. 7 is a wiring diagram of the central station voice amplifier units.

Fig. 8 is a wiring diagram of the power supply for the stepper relay unit.

Fig. 9 is a wiring diagram of the stepper relay circuit.

Fig. 10 is a wiring diagram of the phonograph pickup amplifier.

Fig. 11 is a diagrammatic view of a single phonograph turntable with motor switch and pilot light connections.

Fig. 12 is a diagram of a coin chute signaling device that may be used at the outlying reproducing station.

Fig. 13 is a diagrammatic representation of the coin register stepper relay.

Fig. 14 is a circuit diagram of a control circuit that can be used in conjunction with coin receivers located at a distance away from the outlying station cabinet.

Fig. 15 is a circuit diagram of the power supply and control circuit therefor operating the relays of the circuit shown in Fig. 14.

Figure 16:
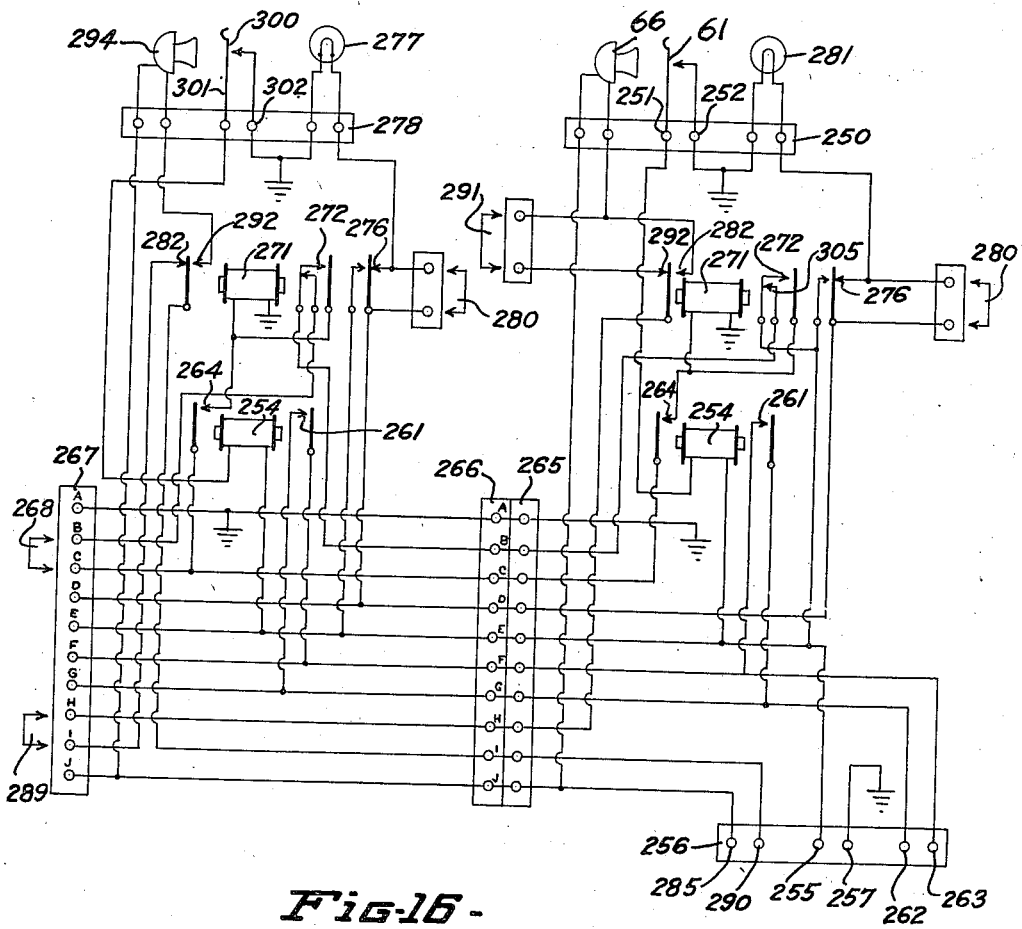
Fig. 16 is a circuit diagram showing a modification of the circuit of Fig. 14.

Referring directly to Fig. 1 for a more detailed description of our invention, a reproducer cabinet 10 is provided, to be installed in whatever public location is selected. This cabinet 10 is of attractive design and is provided on the front thereof with a grille 11 through which sound may pass from a loud-speaker in the cabinet, not shown. Also on the front face of the cabinet we provide coin slides 12 as will be fully described later, for the reception of nickels, dimes and twenty-five cent pieces, as is customary in coin controlled devices. The top 14 of the cabinet is preferably provided with a display surface 15 slanting downwardly to the front of the cabinet 10 and on this display face, we position a printed card 16 carrying the titles of a large number of phonograph records, preferably each identified by a number. Also on the slanting display surface 15 we position a microphone grille 17 backed by a microphone, not shown. Within cabinet 10 is positioned a coin switch, a microphone amplifier, a loud-speaker and speaker amplifier, and a balancing network, all not shown in this figure, but to be described later.

Running into the cabinet 10, and connecting with the apparatus therein, is a single pair of wires 20, leading to a central location and into a distribution block 21 to which other pairs are connected, these pairs going to other reproducing cabinets in other public locations. Wires from the reproducing block 21 enter a control board 22, this control board being provided with an operating face 23, an operating shelf 24, a microphone 25, reproducers 26 and pilot assemblies 27, and if desired volume controls, to be later described. The apparatus contained in this central board will be described later.

A cable 28 passes from the control board 22 to a turntable bank 29 having a plurality of phonograph turntables 30 mounted thereon, each with its individual reproducing arm 31. The phonograph turntables 30 are preferably mounted on the turntable bank 29 on stepped ledges 32 with a slight overhang, to save space, and below each turntable is positioned a record recess 33 into which records waiting to be played may be loaded from a record rack 34 having therein a plurality of phonograph records 36. It will be obvious that the number of phonograph records that can be stored in rack 34 is limited only by the number of records desired to supply requirements of the type of music called for by the outlying stations. In commercial installations of this type, from 500 to 5,000 records are usually kept in stock, each identified with a number corresponding to the number accompanying the titles of the printed lists 16 at the outlying reproducing stations.

Before describing in detail the electrical circuits involved in the setup just described, we believe that such circuits would be more understandable if the gross operation of the device be set out at this point.

The usual complement of help at the central station during the busy hours, i. e., from 11 p. m. to 2 a. m., is two girls. One girl is seated at the operating board 22 and the other girl is positioned to load the record recesses 33 on the turntable bank 29, to load and start the turntables 30 and to take off the played records and redistribute them in the record rack 34. It is convenient to utilize when twenty reproducing stations are utilized, three separate turntable banks, two of six turntables each, and one of nine, leaving one turntable free for substitution as a spare.

Let us assume that a customer at an outlying station desires music. He inserts a coin in one of the coin slides 12, pushes in the proper coin slide. This action lights one or more pilot lights in the pilot light assembly 27, corresponding to the outlying station at which the coin is inserted. The coin slide mechanism is such that the pilot lights in assembly 27 as shown in Fig. 2 are lighted in order and in number corresponding to the monetary value of the coin inserted. For example, if five cents only is inserted, pilot light 40 is illuminated. If ten cents is inserted, pilot light 41 lights and pilot light 40 goes out. If fifteen cents is inserted, pilot light 42 is lighted, and so on in serial order through pilot lights 43, 44, 45, 46, and 47, these eight pilot lights being sufficient to indicate the insertion of forty cents at a time, which is the maximum value that can be inserted in the coin slides 12 at one time.

Upon seeing one of the pilot lights, 40 to 47 inclusive, remain illuminated, the operator moves the main control switch 50 to talking position and utilizing microphone 25, asks for the number of the phonograph record desired, this voice at the reproducing station coming through grille 11 from the main loud-speaker. The operator then throws switch 50 to listening position, and the customer who by this time has made his selection, simply speaks in a normal voice in front of cabinet 10 and gives the number or numbers of the phonograph selections desired, in accordance with the value of the coins he has inserted. The customer's voice is picked up by the microphone back of grille 17, and reproduced to the operator through the central station reproducers 26. The operator writes down on a memo pad the numbers desired and either passes it, or tells these numbers to the operator who is handling the phonograph turntables. The latter selects the record from rack 34 and places it on the turntable, to be played. The music signals developed pass through the central board to the outlying reproducing station, with switch 50 in a neutral position.

The operator can at all times check the operation of the reproducing station as to whether or not the music is being played, by turning the main key 50 to listening position, thereby hearing the music by echo within the public place in which the music is being played, this echo being picked up by the microphone behind grille 17.

If more than one record has been called for and paid for, as indicated by the position of the pilot light 40 to 47 that remains illuminated, the operator tending the records picks out the proper number of records from rack 34 and stacks them below the proper turntable in recess 33, and as long as there is a record in recess 33, the record operator knows that they are entitled to be played. When there are no records in the recess 33 the record operator knows that all that have been paid for have been played.

As soon as the control board operator has checked payment and obtained the numbers of the records called for by the customer, she puts out the illuminated pilot light 40 to 47, by pushing a stepper relay release button 51, and throws her key 50 to neutral. She is, however, able to check the operation of the turntables directly from the operating board 22 as a turntable pilot light 52 is provided adjacent switch 50 which is lit at all times when the phonograph turntable corresponding to adjacent key 50 is rotating. Also adjacent key 50 is a monitor switch 53 which is connected to a power level indicator 54 mounted on the operating board.

Thus, the central operator can receive the calls from outlying reproducing stations, check the money value inserted at the reproducing station, talk to the reproducing station, and control the playback to the reproducing station as well as determine whether or not that particular station is actually in operation.

Having described the gross operation of the system, we will now describe the circuits utilized as shown beginning with Fig. 3, which is a block diagram showing the main units involved.

At the reproducing station, a 60-cycle supply 60 feeds the coin switch 61, preferably through a step-down transformer winding 62 on power transformer 62P to supply 24 volts to the coin switch. The coin switch output line 63 feeds into a network 67 on the network side of a network transformer 64, fed by microphone amplifier 65 under the control of microphone 66 placed back of grille 17 in the reproducing cabinet 10 as shown in Fig. 1. Network transformer 64 and line 63 feed into a balancing network 67, this balancing network feeding laterally into a second network transformer 68 which in turn feeds into a loudspeaker amplifier 69 supplying power to the main loudspeaker 70 placed back of speaker grille 11 of reproducing cabinet 10.

The line leg 71 from the balancing network passes into an isolation transformer 72 and thence to a two-wire line 73 leading to the central station. At the central station the line 73 enters a central station isolation transformer 74 which feeds a central station balancing network 75. One side of this balancing network 76 goes through the usual network transformer 78 into output line 80, this output line being divided and going one way through a 60-cycle filter and rectifier 81 into a stepper relay control 82, the output of which is led to a stepper relay solenoid 83 for actuation of a stepper relay mechanism which energizes pilot lights 40 to 47 inclusive, later to be described.

Output line 80 is also led through listening contacts 50L of switch 50 to central station speaker amplifier 85 which energizes central station speakers 26 on central board 22. The other lateral leg 86 of balancing network 75 is connected to network transformer 87, which is fed by a reproducer amplifier 88 energized by a phonograph reproducer 89 operating in conjunction with turntable 30 driven by turntable motor 90 from a turntable motor supply line 91. Transformer 87 is also fed through the talking contacts 50T of switch 50 from a central station microphone amplifier 92 controlled by central station microphone 25.

In Fig. 4, we have shown the wiring diagram of a complete outlying reproducing station. Here the microphone 66 feeds into microphone amplifier 65 through input transformer 100. This microphone amplifier is a conventional cascade resistance coupled amplifier, all circuits except the cathode heater circuits being shown, comprising triodes 101, 102, and 103 coupled by the customary resistance groups 104 and 105, and having a volume control resistor 107 between first and second tubes 101 and 102. The last tube of the microphone amplifier 65 feeds into network transformer 64 through line 106 and thence into balancing network 67, and to main line 73 through transformer 72. Line 106 is also supplied with 60-cycle current through line 63. Line 106, therefore, can carry the voice signal from microphone 66 and also 60 cycles under control of coin switch 61. One leg 108 of line 106 connects directly to one side of main line transformer 72, whereas the other leg 109 of line 106 connects to the other side of transformer 72 through a variable resistor 110 shunted by capacity 111. Transformer 72 is shunted by shunt resistor 112. Connection 114 is made from one side of transformer 72 directly to lateral network transformer 68, the other side of transformer 72 being connected to transformer 68 through a series resistor 115. Leg 109 is cross-connected to the transformer end of resistor 115 by cross-resistor 116. Thus, music from the central station carried by line 73 will pass to loud-speaker amplifier 69. We have found that a practical balancing network may have all connected transformer elements, for example, and all resistors except 110, measuring 500 ohms, and we prefer to make resistor 110, 750 ohms shunted by .1 mfd. capacity. Such a balancing network may be adjusted by adjusting the value of resistor 110, so that there is minimum feedback between microphone 66 and loudspeaker 70 through amplifier 69, and minimum 60-cycle transfer to amplifier 69, so that the 60 cycles may be passed outwardly with minimum interference with any music signals that might be coming in.

Amplifier 69 is fed from network transformer 68 through a potentiometer volume control 120, this volume control having separate connections 121 which can be used for the insertion of a remote volume control if desired. The incoming music signals are then passed to a double triode input tube 122, the anodes 123 of which feed through resistance 124, a pair of push-pull output tubes 125 and 126. The output of these latter tubes is passed through an output transformer 127, the secondary 128 of output transformer 127 being divided by a center tap 129 into a pair of separate output circuits. A 4-ohm circuit leads to a 4-ohm socket 130, and a combined or 8-ohm circuit leads to an 8-ohm socket 131. Loudspeaker 70 preferably is a dynamic type operated by voice coil 132 as is customary in the art, and has a field coil 133. The voice coil and field coil are connected to a removable plug 134 which may be inserted in either the 4-ohm socket 131 or the 8-ohm socket 130 as desired. In case one only speaker is used, we may use the 8-ohm circuit. However, in case more than one speaker is desired, i. e., an extension speaker, as may be desirable in any large public location, then both speakers are attached to the 4-ohm winding in parallel.

Amplifiers 65 and 69 are provided with positive D. C. by a power supply connection to a full wave rectifier tube 140 supplied by rectifier winding 141 on power transformer 62P, and a rectifier filament winding 142. The output of rectifier 140 is led through the usual brute force filter comprising inductances 144 and shunt capacities 145, this power supply having a positive leg 146 supplying tube 122 in amplifier 69, a leg 147 supplying the output tubes 125 and 126 in amplifier 69, and a connection 148 supplying the anodes of the tubes 101, 102, and 103 in amplifier 65. Field coil current is supplied to field coil 133 of speaker 70 through field coil connection 149. A special display lamp winding 62D may be used to supply display lamps in cabinet 10, certain of which may be used to illuminate list 16.

Thus, at the outlying reproducer we have provided a microphone amplifier feeding outwardly through a balancing network, a 60-cycle supply feeding outwardly through the balancing network, and a speaker amplifier and speaker receiving signals from the line 73 through the balancing network, all utilizing the same power supply. The action of the 60-cycle coin switch will be described later.

In connection, however, with the main speaker amplifier 69, it may be desirable to incorporate therein an equalizer circuit and a bass control, in order to compensate for the acoustic characteristics which may exist in individual locations. This may be accomplished as shown in Fig. 5, where a tap 150 is taken from secondary 128 of output transformer 127, passed through a variable impedance circuit 151 and thence to the input grid 152 of input tube 122 of amplifier 69 through series resistors 153 and 154, the connection between the latter being grounded through capacity 155 and a variable resistor 156. Thus, in accorance with the values of the variable impedance circuit 151 and resistor 156, various amounts of reverse feedback may be transferred to the input of the amplifier in different frequency ranges and the bass response may be raised or lowered as desired. In most installations such a frequency adjustment is made at the time of the installation of the producer cabinet, and such adjustments are not made available to the customer, or to any other than servicemen handling the entire distribution system.

Having described the circuits utilized at outlying stations, we will now follow line 73 into the central station, the first central station unit encountered being the isolation transformer 74 which feeds central station balancing network 75. Central station balancing network 75 is shown in Fig. 6 and as the frequencies passed are the same as at the reproducing station the values of the network elements may be identical with those of the reproducing station network and therefore these elements have been given the same number as used in the outlying reproducer network 67.

The lateral legs of the central station balancing network feed central station circuits as shown in Fig. 7, which shows however, only the listening and talking amplifiers 85 and 92, respectively, together with their power supply, the phonograph amplifier and the stepper relay circuits being separately shown.

Outgoing voice signals initiated by microphone 25 are passed into resistance coupled amplifier 92 comprising cascaded triodes 160, 161, and 162 coupled by resistor groups 163 and 164, the output tube 162 feeding into switch 50 contacts 50T through output transformer 165, feeding into network transformer 87 so that voice signals from microphone 25 may enter the network 75 and thence be passed into the line 73. Incoming voice signals from the line 73 enter the network 75 and are passed throught network transformer 78 and thence through the listening contacts 50L of key 50 to input transformer 166 of listening amplifier 85 comprising an input tube 167 feeding output tube 168, the latter, through an output transformer 169 feeding reproducers 26 in parallel. Tubes 167 and 168 are coupled by a resistance group 170. It may be desirable to allow the central operator to control the gain of both amplifiers 85 and 92, and if so, amplifier 85 is provided with a volume control potentiometer 171, which is placed on the front face 25 of the operating board 22. Likewise, amplifier 92 may be provided with a voice volume control potentiometer 172, and this may also be placed on operating board 22. Thus, the operator will be able to control at all times the outgoing voice volume and the incoming voice and music monitor volume. In some cases it may be desirable that the levels be changed slightly for different outlying stations.

Both amplifiers 92 and 85 are supplied from a conventional power supply comprising a power transformer 180, a full wave rectifier tube 181 and filter 182, a positive lead 183 supply both amplifiers. We also prefer to use this same power supply to operate the impulse amplifier 82 and for this purpose provide a tap 184. Tap 184 may also supply the 60-cycle amplifier tubes in each stepper relay circuit, as described later. A secondary winding 185 on transformer 180 supplies pilot lamps 40—47 through pilot line 186. All reproducer amplifiers 88 are supplied by a power pack in rack 32.

The music signals sent out from the central station are taken off the record by reproducer 89 and used to energize music amplifier 88 as shown in Figs. 10 and 11. This is a high fidelity resistance coupled amplifier comprising input tube 190 and output tube 191 coupled by resistance groups 192 and 193, the signal to output tube 191 being under the control of tap 194 on one of the coupling resistors of group 193. This amplifier is provided with the usual output transformer 195 feeding into network transformer 87, which also receives voice signals under the control of contacts 50T of switch 50.

Thus, it will be seen that the phonograph pickup 89 is always connected to its own line 73, ready for music signals transmission thereto. The phonograph turntable motor 90 is under the control of arm switch 196, and as previously explained, the operator is able to determine whether or not the phonograph table is rotating, by the turntable pilot lamp 52 which is connected across motor 90 through transformer 197 on the motor side of arm switch 196. Inasmuch as arm switch 196 turns off turntable motor 90 when the end of the record is reached, and is turned on automatically by the movement of the arm to a position where the reproducer 89 starts the record playing, the operator is at all times aware of the starting and stopping of each record.

Thus, we have described the circuits by which the operator may listen to, and talk to each outlying station. It will also be obvious from the circuits described so far, that the central station operator may not only listen to any voice signals entering outlying station microphone 66, but may also listen to the music being played through outlying station speaker 70, by echo. Inasmuch as the echo response of microphone 66 will be low, a voice at the outlying station can be heard over it, and records requested even though a record is being played. The 60-cycle coin checking impulses can also be transmitted to the central station while a record is being played.

Having thus described the voice and music circuits of our system, we will now describe the coin signaling circuits insofar as they are apart from the circuits already described.

As has previously been described, 60 cycles from the main 60-cycle supply, stepped down by transformer winding 62 on transformer 62P to 24 volts for signaling purposes, is controlled by a coin switch 61. One form that such a coin switch may have is shown in Fig. 12, although we wish it distinctly understood that there are many types of coin switches and that any type suitable for sending out interrupted current in units will be satisfactory for this purpose. Fig. 12 is purely diagrammatic and suggestive.

The particular type of coin slide 12 shown diagrammatically in Fig. 12 comprises a five cent coin slide 200, a ten cent coin slide 201, and a twenty-five cent coin slide 202 all projecting outwardly from cabinet 10. Each slide has an appropriate coin receptacle 203 therein. Inside the cabinet an operating lever 204 is positioned with the end of each slide 200, 201, 202 in position to contact the lever 204 at a different distance from lever pivot 206. The end of the lever 204 is provided with a pawl 207 held against a ratchet wheel 208 by a spring 209. Ratchet wheel 208 is connected by a shaft 210 to a switch arm 211, which operates over a stationary switch disc 212, having a plurality of spaced contacts 213 thereon, all connected together, and to leg 109 of line 106 (Fig. 4). Switch arm 211 is connected to one leg of line 63, and the contour of switch disc 212 and the connection to disc 208 is such that switch arm 211 always stops between two contacts 213. Thus, when arm 204 is moved by one of the coin slides 200, 201 or 202 moving inwardly, unlocked by the coin, the switch arm 211 is rotated over one or more contacts 213 as determined by the swing of the arm 204, thus giving to line 63, 60-cycle impulses in accordance with the value of the coin placed in the coin slides. Arm 204 returns without rotating disc 212.

At the central station the 60-cycle impulses pass through the balancing network 75 into 60-cycle filter and rectifier unit 81 and stepper relay control 82 in series, as shown in block in Fig. 3, and shown in detail in Fig. 9. The 60-cycle signals pass to the filter 81 through network transformer 78 and energize 60-cycle amplifier tube 220 (Fig. 9), the anode circuit of which contains a 60-cycle coupling circuit 221. This circuit 221 is tuned sharply to 60 cycles and therefore excludes other frequencies, such as might come in over the line. Anode voltage for tube 220 is taken off lead 184 of the power supply feeding amplifiers 85 and 92. The selected 60-cycle impulses are then passed to rectifier tube 222 coupled to the grid 223 of a grid controlled gaseous conduction tube 224. Such tubes are known in the art as "thyratron" impulse amplifiers, the action of which is well known. The anode 225 of thyratron tube 224 is supplied through line 226 coming from a single wave rectifier tube 227 supplied by a secondary 227a on power transformer 228, shown in Fig. 8. This rectifier also supplies a bias circuit 229 for thyratron grid 223. A low voltage winding 229a supplies the thyratron cathode.

The output of the grid controlled gas tube 224 is then passed through a coupling circuit 228d to the stepper relay solenod 83, as shown in Fig. 13. Stepper relay solenoid 83 attracts an armature 231 attached to a pivoted arm 232 having a terminal 233 engaging teeth 234 of relay disc 235. Relay arm 232 is returned from the relay solenoid by return spring 236. Relay disc 235 drives a relay switch arm 240 through a shaft 241, this shaft being returned to zero position by a shaft spring 242, this position being determined by pin 243. Relay switch arm 240 traverses pilot light contacts 245, each connected with an indicator pilot light 40 to 47 inclusive. The disc 235 and switch arm 240 are held in position as determined by the number of strokes of relay arm 232 by latch 246, this latch being releasable by pushing on stepper relay release button 51 positioned on the operating board above pilot lights 40 to 47 inclusive. Thus, as the stepper relay operates, it moves switch arm 240 serially over the pilot light contacts 245, and the last light remains lit until the disc 235 is released by pushing button 51, the lamp current coming in over line 186. Thus, the pilot light lit corresponds in position in the assembly to the accumulative five cent unit value of the coin inserted in coil slides 200, 201, and 202, giving the operator a definite check on the value of coins inserted in the coin slide.

In order to prevent unauthorized operation of the stepper relay, thereby falsely indicating the placing of coins in the coin slides, various units of the system as a whole are made insensitive to 60 cycles.

Referring to Fig. 3, it will be noted that balancing network 67 can be made sensitive to 60 cycles entering the network from the coin switch. In order, however, to prevent false operation of the stepper relay through energization of microphone 66 by 60-cycle sound, for example, we may make amplifier 65 cut off well above 60 cycles, inasmuch as such lower voice frequencies are not necessary for voice clarity. Also, at the central station, balancing network 75 may be made to have clear path for 60 cycles into the filter and rectifier units 81 and 82. Balancing network, however, can also be adjusted so that there is a poor transmission of 60 cycles laterally through the network, from network transformer 76, so that adventitious 60-cycle notes originating in either microphone 25, voice amplifier 92, or the reproducer amplifier 98 carrying music signals, will be too low in value to operate the stepper relay. Thus, it will be seen that it is nowhere necessary to curtail the high fidelity of the music circuits, and that the cutoff existing in the outlying voice amplifiers 65 is such that the cutoff there in no way impairs the ability of the central station operator to understand the voice signals.

Thus, it will be seen that we have provided a system which can be wholly operated over a single conductive pair connecting each outlying station with the central station with full two-way voice communication, one-way 60-cycle communication and one-way music communication. The circuits as described have been so balanced as to allow two-way voice communication with perfect understanding even when music is being played to an outlying station. The voice level from the outlying station to the central station is such that the voice may readily be understood over and above the echo pickup of the music, and the voice communication from the central station back to the outlying loud-speaker is such that it may be understood over and above the outgoing music. Furthermore, the 60-cycle impulse path from the outlying station through to the stepper relay is operable, due to the use of tuned filter 221, irrespective of the central station connections, and even during the playing of music from the central station to the outlying station. This means, therefore, that any outlying station can, during the playing of a record, insert additional coins to operate the stepper relay and, in spite of music signals on the line, gain the operator's attention and tell the operator the numbers of additional selections without having to stop the music being played. Thus, the system is fool-proof as regards coin value indication and voice communication even while the music is being reproduced.

The circuits at the outlying reproducing stations are maintained energized at all times, except when the public location at which the reproducer is installed is closed. At that time a main switch may be opened in order that the reproducing station power supply transformer 62P may be deenergized. This, of course, deenergizes the display lights and the proprietor of the outlying station can easily tell whether the reproducer unit is energized or not. The central station operator can easily tell whether the outlying station is alive or not by listening on the particular line connected to the outlying station. If no extraneous noise is received, she may know the station is shut off; but if she desires, she can play music into the line and if no echo is received, she can be sure that the station is cut off. Thus, at all times the central station operator has full control of, and full knowledge of, the circuit conditions at each outlying station.

In many cases it is desirable that coins to operate the outlying station cabinet be inserted at points other than at the cabinet itself. Many times, such cabinets are used in public places where there are spaced booths, and it is desirable under these circumstances that the system be capable of operation from a plurality of booth locations. Figs. 14 and 15 show a control circuit which is adapted to connect a number of auxiliary control stations positioned at a distance from the cabinet. In Figs. 14 and 16, the right-hand portion of the circuit represents the wiring installed in the speaker cabinet, and the left-hand portion of the diagram represents the circuit used at the remote control stations, such as a booth or a plurality of booths, for example. It is believed that these circuits may be more clearly understood by a combined description of the apparatus and operation thereof. All relay armatures in these figures are shown in resting positions.

The circuit shown in Fig. 14 is adapted to handle a plurality of coins at the cabinet, and a single coin at a time only at the auxiliary control station. We will first describe the system as operated from the cabinet.

A connection block 250 is provided, carrying lugs 251 and 252 across which coin switch 61 is connected. This coin switch may be the same switch as previously described for use in the speaker cabinet. The lug 252 may be grounded, and lug 251 leads through relay 254 and thence to lug 255 on main connection block 256. Lug 255 has a companion lug 257 adjacent thereto, and these two lugs are connected to a relay power supply 259 through a relay power switch 260, as shown in Fig. 15, this switch normally being held closed. A momentary current flow for each coin value caused by closure of coin switch 61, through relay 254, causes signal contacts 261 to close, these contacts 261 being connected through lugs 262 and 263 on block 256 to signaling line, as in the modification previously described. This energization of relay 254 also closes contacts 264 which control a circuit as follows: from ground to contact C on junction blocks 265—266 to contact C on second junction block 267, thence through strap 268 connecting lugs A—C, through the normally closed contacts 269 of relay 270, back through lugs A on junction blocks 265 and 266, through the closed contacts 264, thence through relay winding 271, and thence to lug 255 on block 256, completing the energization of relay 271. Relay 271 then operates and holds by virtue of the make-before-break contacts 272 thereof until the relay power supply 259 is interrupted by the operation of relay 274, opening power supply contacts 260, as shown in Fig. 15. How relay 274 is operated will be described later.

The holding of relay 271 opens the operating paths of relays 270 and 275 so that these relays cannot be operated until relay 271 is released. Relay 271 also closes contacts 276 connecting power lug 255 to a busy lamp wire 278 passing through junction blocks 265—266, as lugs B thereon, which lights the busy lamp 277 on block 278, at any remote control station.

At the speaker cabinet location, we provide a strap 280 which will also connect a cabinet busy lamp 281 on the speaker cabinet, if desired. Thus, busy lamps 277 and 281 act as busy signals, so that if a coin is inserted at the cabinet location all of the busy lamps at auxiliary locations will light. If desired, a busy lamp may be lit at the speaker location itself.

Relay 271 also operates microphone contacts 282 which energize microphone 66 at the speaker cabinet, this microphone having one connection 284 connected directly to lug 285 on block 256, the other microphone connection 286 passing through contacts 282 to lugs F on junction blocks 265—266 through normally closed contacts 287 on relay 270 to lug F on plug 267, thence through strap 289 to lugs G on connection blocks 266, 265 back to microphone lug 290 on block 256. Lugs 285 and 290 are connected to microphone amplifier 65 in the speaker cabinet.

We may desire, however, to connect a strap 291 to contact 292, normally closed by relay 271, so that contacts 282, 292 are connected together. This strap 291 when used, connects the cabinet microphone 66 to the line at all times, except when an auxiliary location relay 270 is operated. This is so because strap 291 at all times closes contact 282 normally operated by relay 271 so that the cabinet microphone 66 is energized irrespective of whether relay 271 is energized or not.

After relay 271 has once been operated, any additional coins passing through coin switch 61 at the cabinet location will cause signaling relay 254 to momentarily operate to transmit the 60-cycle coin signals to the central operating station, but will not affect the rest of the circuit.

As the circuit is now set up, the coin has been dropped into cabinet coin switch 61, relay 271 is energized, cabinet microphone 66 is operating, and busy lamps 281 and 271 are both illuminated when strap 280 is used. Once the central station operator has received her instructions via cabinet microphone 66 and checked her coin values, she then releases relay 271 by opening power supply relay contacts 260, as will be described later, the busy lamps go out, and cabinet microphone 66 will remain energized or not, in accordance with whether or not strap 280 is used.

We will now describe the circuits that are utilized when the coin is dropped in an auxiliary station. A single coin auxiliary switch 300 is used, which is connected across lugs 301 and 302 on block 278. Dropping of a coin in auxiliary switch 300 causes a momentary current flow from ground lug 257 through grounded lugs C on connection blocks 267, 266, and 265. The current passes through strap 268 to lug A on block 267, thence through normally closed contacts 269, thence to lugs A on connection blocks 266 and 265, thence through normally closed contacts 305 on relay 271, thence through relay winding 275, thence through lugs D on connection blocks 266, 265, thence through switch 300, thence through relay winding 270, thence returning to the power supply through lugs E on connection blocks 266 and 265, and finally to power supply lug 255 on block 256. Relay 275 will close 60-cycle contacts 306, which are parallel in 60-cycle contacts 261 operated by relay 254, so that a momentary coin signal 60-cycle impulse will be sent out to the central station. Auxiliary relay 270, however, when energized will hold because of its make-before-break contacts until the power supply circuits are interrupted by the operator to release relay 270. Relay 270 also opens the operating paths of relays 275, 254, and 271 so that these cannot be operated until relay 270 is released. Relay 270 operates contacts 308 which closes the busy lamp circuits at all locations. Relay 270 also, through contacts 295, connects the auxiliary microphone 294 to the lugs 285 and 290 on block 256, and also by means of contacts 287 disconnects the cabinet microphone if it is continuously connected to the line by the use of strap 291. This connection and disconnection being done by the shift from contacts 287 to contacts 295.

Thus, it will be seen that we have provided circuits which can be extended as desired, so that a plurality of auxiliary stations, each comprising a microphone, a coin switch, and a busy lamp, are interconnected so that when the coin switch at the cabinet location, or at any auxiliary location, is operated, a busy lamp will be shown at all other locations. All other microphones will be cut off, and the operated circuit will hold until the operator at the central station releases it. One release circuit that may be utilized by the operator is shown in Fig. 15.

In the release circuit shown in Fig. 15, 60-cycle line 60 is connected to the primary 320 of the transformer 321, having a divided secondary 322. The ends of secondary 322 lead to anodes 324 and 325 of a double diode tube 326, and the midtap of the transformer leads to the cathode 329 of tube 326 through a resistor 330 shunted by a capacity 331. Grids 332 and 334 of tube 326 are energized by the divided secondary 335 of a signal transformer 336, the primary 337 thereof being connected to line terminals 338 which are connected to the line at all times. The heater 340 of tube 326 is supplied by heater winding 341 on transformer 321.

A relay control triode tube 342 is utilized, having the anode 343 thereof connected through power relay winding 274 to one side of A. C mains 60. Winding 274 is preferably shunted by a condenser 345 and the grid 346 of tube 342 is supplied from resistor 330 by movable tap 347. In operation, 60-cycle current from the mains 60 is supplied to anode 343 of tube 342 and to anodes 324 and 325 of tube 326. This A. C. is in such phase that grid 346 is always negative when anode 343 is positive, tap 347 on resistor 330 being moved until tube 342 is blocked. Under normal circumstances, connections 338, which are to the line, receive only signals comprising music, speech, and 60 cycles from the coin switch circuit. The 60-cycle coin switch signals are applied to grids 332 and 334 in such phase as to cause anodes 324 and 325 to continue to pass current through tube 326. Thus, the coin switch signals will not affect the blocking of tube 343, nor will any momentary noncylic phase shifts in the music, or speech signals, prevent such blocking, as we prefer to use a condensor 331 across resistor 330 so that response is sluggish.

When, however, the operator at the central station desires to release the relay power switch 360, she sends out over the main lines a 60-cycle signal of a phase opposite to that of the 60-cycle switch signals. This reverse phase 60-cycle signal reaches grids 332 and 334 of tube 326 in proper phase to drive grids 332 and 334 cyclically negative when anodes 324 and 325 are positive, thus blocking the tube 326. Tube 326, being blocked, can pass no current through resistor 330, thus removing the negative potential on grid 346 of tube 342 and allowing tube 342 to pass current. This current passes through relay winding 274, opening switch 260 for a period coinciding substantially with the reverse phase signals sent out by the central operator. As soon as the holding relays 270 and 271 have had time to release, the central office signal is stopped, switch 260 recloses and the control locations are ready for a new coin insertion. Thus, it will be seen that we have provided a system where the locally generated 60-cycle signals, and music and voice signals, will not operate the relay power supply switch 260, but where a central station 60-cycle signal in proper phase will operate it. We have found that in the relatively short telephone pairs used between central and outlying stations, no appreciable phase rotation occurs, and that exact phase reversal is not necessary to operate the release relay.

In Fig. 16, we have shown a modification of the circuit of Fig. 14 where all coin values may be inserted both at the cabinet, or at any of the auxiliary stations. In view of the rather complete description of Fig. 14 given herein, it is not believed necessary to follow through the circuits in detail in Fig. 16. The main differences between the circuit of Fig. 14 and that of Fig. 16 are that the signal relay 275 shown at the cabinet location in Fig. 14 is omitted in the circuit shown in Fig. 16, and a relay 254 is used at all auxiliary stations. Two additional lugs are added to connection blocks 267, 266, and 265 to carry the 60-cycle signal line into all of the auxiliary locations to relays 254. Thus, relays 254 direct the coin signals to the main lines directly from the cabinet locations and from all auxiliary locations. Relays 271 hold in exactly the same manner as they did in the circuit of Fig. 14, and otherwise the operation of the system is the same. Thus, it will be seen that the circuit of Fig. 16, at each auxiliary location is a substantial duplicate of the cabinet circuit of Fig. 14 with signal relay 275 omitted and a separate keying and control relay 254 added at each auxiliary location.

We claim:

1. In a wired music system, a central station and an outlying station, a line having two conductors only connecting said stations, a balancing network at each station and connected to said line, a high fidelity sound reproducing circuit fed from the outlying station network, a microphone circuit feeding into said outlying station network, means for feeding separate 60-cycle impulses into said outlying station network and thence into said line, a 60-cycle impulse amplifier circuit fed from the central station network, a step relay actuated by and in accordance with the number of amplified 60-cycle impulses, indicator lamps serially lighted by said relay, a phonograph record pickup circuit feeding into said central station network, and talking and voice receiving circuits connectible at will to said pickup and 60-cycle circuits respectively in response to indicator lamp illumination.

2. Apparatus in accordance with claim 1 wherein a coin switch is provided and means are provided to feed 60-cycle energy into said outlying station network and said line in impulses corresponding in number to the five cent unit value of the coins passed through said coin switch.

3. Apparatus in accordance with claim 1 wherein a coin switch is provided and means are provided to feed 60-cycle energy into said outlying station network and said line in impulses corresponding in number to the five cent unit value of the coins passed through said coin switch and wherein the lamp lighted by said step relay indicates total coin value.

4. Apparatus in accordance with claim 1 wherein said 60-cycle impulse amplifier comprises circuit means for excluding other than 60-cycle signals, a rectifier of signals passed, and a grid controlled gaseous discharge tube controlled by said rectified signals for operating said step relay.

5. Apparatus in accordance with claim 1 wherein said central station is provided with an operating board containing central station networks terminating a plurality of two-wire lines from a plurality of outlying stations, and wherein a single talking circuit and a single voice reproducing circuit are connectible at will to any one of the central station networks.

6. Apparatus in accordance with claim 1 wherein said central station is provided with an operating board containing central station networks terminating a plurality of two-wire lines from a plurality of outlying stations, wherein a single talking circuit and a single voice reproducing circuit are connectible at will to any one of the central station networks, and wherein the indicator lamps controlled by each network are grouped in separate areas on said board and in a predetermined order thereon.

7. Apparatus in accordance with claim 1 wherein said central station is provided with an operating board containing central station networks terminating a plurality of two-wire lines from a plurality of outlying stations, wherein a single talking circuit and a single voice reproducing circuit are connectible at will to any one of the central station networks, wherein the indicator lamps controlled by each network are grouped in separate areas on said board and in a predetermined order thereon, and wherein means are provided adjacent said lamps for resetting said step relay after operation thereof.

8. Apparatus in accordance with claim 1 wherein said central station is provided with an operating board containing central station networks terminating a plurality of two-wire lines from a plurality of outlying stations, wherein a single talking circuit and a single voice reproducing circuit are connectible at will to any one of the central station networks, wherein the indicator lamps controlled by each network are grouped in separate areas on said board and in a predetermined order thereon, wherein each phonograph pickup is actuated by a record turntable and driving motor therefor, and wherein a signal lamp energized in parallel with each motor is positioned adjacent the lamp group connected to the same network as said pickup.

9. A system for signaling over a line having two conductors only carrying heterogeneous audio frequencies which comprises, a music signal generator connected to one end of said line, a music signal reproducer connected to the other end of said line, a 60-cycle impulse generator connected to the signal reproducer end of said line and a 60-cycle impulse indicator connected to the signal generator end of said line, a network at the reproducer end of said line for providing a relatively high impedance path between said impulse generator and said signal reproducer, and a second network means at the signal generator end of said line for providing a relatively high impedance path between said music signal generator and said impulse indicator.

10. Apparatus in accordance with claim 9 wherein a continuously energized microphone circuit is connected to the network at the signal reproducer end of said line in parallel with said impulse generator, and wherein said microphone circuit is filtered to exclude 60-cycle voice currents.

11. Apparatus in accordance with claim 9 wherein a continuously energized microphone circuit is connected to the network at the signal reproducer end of said line in parallel with said impulse generator, wherein said microphone circuit is filtered to exclude 60-cycle voice currents, and wherein a listening circuit is connected at will to the second network in parallel with said impulse indicator.

12. Apparatus in accordance with claim 9 wherein a continuously energized microphone circuit is connected to the network at the signal reproducer end of said line in parallel with said impulse generator, wherein said microphone circuit is filtered to exclude 60-cycle voice currents, and wherein said impulse generator is coin actuated.

13. Apparatus in accordance with claim 9 wherein a continuously energized microphone circuit is connected to the network at the signal reproducer end of said line in parallel with said impulse generator, wherein said microphone circuit is filtered to exclude 60-cycle voice currents.

wherein a listening circuit is connected at will to the second network in parallel with said impulse indicator, and wherein said impulse generator is coin actuated.

14. The method of signaling over a two-wire line carrying music signals which comprises connecting a music signal reproducer and an impulse generator to one end of said line through a network providing a relatively high impedance path between said generator and said reproducer, a relatively low impedance path between both and said line connecting a music signal generator and an impulse receiver to the other end of said line through a second network providing a relatively high impedance path between said signal generator and said impulse receiver, and a relatively low impedance path between both the latter and said line whereby both signal transmission and impulse transmission may simultaneously take place over said line.

15. Method in accordance with claim 14 wherein said impulse generator is intermittently operated and wherein voice signals are supplied to said line over the 60-cycle impulse path.

16. Apparatus in accordance with claim 9 wherein a plurality of microphones are provided at spaced locations at the music signal reproducer end of said line, feeding into said line under control of a holding relay associated with a coin switch at each location, said holding relay disconnecting all the remaining microphones, and a holding relay power supply controlled by 60-cycle signals originating from the other end of said line and in a phase opposite to the 60-cycle signals generated at said music signal reproducer end of said line.

17. Apparatus in accordance with claim 9 wherein a plurality of microphones are provided at spaced locations at the music signal reproducer end of said line, feeding into said line under control of a holding relay associated with a coin switch at each location, said holding relay disconnecting all the remaining microphones, and a holding relay power supply controlled by 60-cycle signals originating from the other end of said line and in a phase opposite to the 60-cycle signals generated at said music signal reproducer end of said line, said holding relays also controlling a circuit lighting a busy lamp at all microphone locations other than that where said coin switch is operated.

LEONARD L. LEYRER.
ROBERT L. STARK.